(12) United States Patent
Marchalot et al.

(10) Patent No.: US 9,649,633 B2
(45) Date of Patent: May 16, 2017

(54) DEVICE FOR THE FRACTIONATION OF A FLUID CONTAINING PARTICLES AND FOR THE EXTRACTION OF A VOLUME OF INTEREST

(71) Applicants: Commissariat a l'energie atomique et aux ene alt, Paris (FR); CENTRE NATIONAL DE LA RECHERCHE SCIENTIFIQUE, Paris (FR)

(72) Inventors: Julien Marchalot, Lyons (FR); Jean-Luc Achard, Grenoble (FR); Yves Fouillet, Voreppe (FR)

(73) Assignees: Commissariat à l'énergie atomique et aux énergies alternatives, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 14/406,795

(22) PCT Filed: Jun. 11, 2013

(86) PCT No.: PCT/EP2013/062043
§ 371 (c)(1),
(2) Date: Dec. 10, 2014

(87) PCT Pub. No.: WO2013/186218
PCT Pub. Date: Dec. 19, 2013

(65) Prior Publication Data
US 2015/0144577 A1 May 28, 2015

(30) Foreign Application Priority Data
Jun. 11, 2012 (FR) ...................... 12 55437

(51) Int. Cl.
*B01L 3/00* (2006.01)
*B01D 21/26* (2006.01)

(52) U.S. Cl.
CPC ...... *B01L 3/502753* (2013.01); *B01D 21/265* (2013.01); *B01L 3/5021* (2013.01); *B01L 2200/0621* (2013.01); *B01L 2200/0636* (2013.01); *B01L 2200/0652* (2013.01); *B01L 2300/044* (2013.01); *B01L 2300/0681* (2013.01); *B01L 2300/0832* (2013.01); *B01L 2400/0409* (2013.01); *B01L 2400/049* (2013.01); *B01L 2400/0478* (2013.01)
(Continued)

(58) Field of Classification Search
CPC B01L 3/502753; B01L 3/5021; B01D 21/265
(Continued)

(56) References Cited

U.S. PATENT DOCUMENTS 3,931,018 A * 1/1976 North, Jr. ............... B01D 33/01
210/359
4,318,803 A * 3/1982 Holmgren .......... A61B 10/0038
206/229
(Continued)

FOREIGN PATENT DOCUMENTS

EP 2 119 504 11/2009
GB 2 392 854 3/2004

OTHER PUBLICATIONS

Faivre, M. et al., "Geometrical Focusing of cells in a microfluidic device: An approach to separate blood plasma", Biorheology, vol. 43, No. 2, pp. 147-159, (Jan. 12, 2006), XP 008097626.
(Continued)

*Primary Examiner* — Jill Warden
*Assistant Examiner* — Jacqueline Brazin
(74) *Attorney, Agent, or Firm* — Oblon, McClelland, Maier & Neustadt, L.L.P.

(57) ABSTRACT

A device for fractionation of a fluid containing particles and extraction of a particle-lean volume and a particle-rich volume, including: a cylindrical reservoir including an inlet orifice to supply the reservoir with fluid in a pumping
(Continued)

direction from first to second ends of the reservoir; a fractionation body extending along a central axis of the reservoir, an upstream end positioned in vertical alignment above the inlet orifice, a cross section of the fractionation body reducing sharply at its downstream end; the fractionation body defining, with the reservoir, a first passage opening at the downstream end onto a recirculation zone with a geometric singularity; and an extraction mechanism downstream of the fractionation body to separate and extract the lean and rich volumes, including a partition delimiting an extraction volume configured, as fluid circulates in the pumping direction, to receive the particle-lean phase formed in the recirculation zone.

20 Claims, 13 Drawing Sheets

(58) Field of Classification Search
USPC .......................................................... 422/534
See application file for complete search history.

(56) References Cited

U.S. PATENT DOCUMENTS

| | | | |
|---|---|---|---|
| 2004/0065628 A1* | 4/2004 | Fout | B01D 19/0057 210/788 |
| 2007/0083155 A1* | 4/2007 | Muller | A61M 5/1408 604/91 |
| 2009/0001027 A1* | 1/2009 | Carew | A01K 63/045 210/748.13 |
| 2009/0283474 A1* | 11/2009 | Achard et al. | 210/643 |
| 2009/0311092 A1* | 12/2009 | de Broqueville | B01J 2/16 415/203 |
| 2010/0000620 A1* | 1/2010 | Fouillet | B01L 3/50273 137/827 |
| 2010/0206904 A1* | 8/2010 | Staub et al. | 222/137 |
| 2012/0107799 A1* | 5/2012 | Daum | C12Q 1/6806 435/6.1 |
| 2012/0224981 A1 | 9/2012 | Fouillet et al. | |
| 2013/0175171 A1 | 7/2013 | Aizel et al. | |
| 2013/0284024 A1 | 10/2013 | Roux et al. | |
| 2014/0044568 A1 | 2/2014 | Fouillet et al. | |
| 2014/0060206 A1 | 3/2014 | Fouillet et al. | |

OTHER PUBLICATIONS

French Search Report Issued Mar. 19, 2013 in Application No. FR 1255437 Filed Jun. 11, 2012.
International Search Report Issued Aug. 30, 2013 in PCT/EP13/062043 Filed Jun. 11, 2013.
Nicole Pamme, "Continuous flow separations in microfluidic devices" Lab on a Chip, 2007, pp. 1644-1659.
Hideaki Tsutsui, "Cell separation by non-inertial force fields in microfluidic systems" Mechanics Research Communications, 2009, pp. 92-103.

* cited by examiner

DEVICE FOR THE FRACTIONATION OF A FLUID CONTAINING PARTICLES AND FOR THE EXTRACTION OF A VOLUME OF INTEREST

TECHNICAL FIELD

The invention relates to the field of micro-fluidics and concerns a device for the fractionation and extraction of a volume of interest of a fluid containing particles.

STATE OF THE PRIOR ART

Generally speaking, when it is wished to analyse a sample of fluid containing particles, it is necessary to fractionate this fluid beforehand in order to separate a particle-rich fluid volume from a particle-lean fluid volume in order to take into account only the fluid volume of interest. In the case of blood analysis in particular, it is necessary to separate the blood samples in order to separate the blood cells (particles) from the plasma/serum in order to carry out analyses on the plasma, for example: coagulation tests, screenings, blood composition analyses.

Particle-rich fluid volume is taken to mean a first fluid volume in which the particle concentration is greater than the average particle concentration of the total volume of the fluid containing particles and particle-lean fluid volume is taken to mean a second fluid volume in which the particle concentration is less than the average particle concentration of the total volume of said fluid.

The fractionation step is generally carried out by centrifugation or filtration techniques. The fractionation and analysis steps are mainly carried out in specialised laboratories requiring qualified personnel and appropriate systems. To carry out a blood analysis for example, it is necessary to centrifuge the blood samples in a laboratory to separate the blood cells (red globules) from the plasma/serum.

The fact that these steps are carried out in a laboratory introduces several constraints: a waiting time between the two steps during which a sensitive sample can degrade, the availability of laboratory equipment and personnel, the cost, the difficult reproducibility and homogeneity of the overall process of fractionation and analysis of the sample.

An advance has been found thanks to the miniaturisation of analysis microsystems (also known as "labs on chips") which make it possible to have available easily and rapidly an analysis system and thus to relax in part the constraints set forth above. These are then referred to as microsystems comprising analysis means. A fractionation step is however still necessary to be able to use this type of lab on chip. Therefore, resorting to the services of a laboratory remains necessary to fractionate an important volume of fluid (several mL).

In order to eliminate the necessity of the fractionation step carried out outside of the analysis microsystem, recent studies have ended up in the development of numerous techniques making it possible to create analysis and fractionation microsystems grouped together on the same chip. These are then referred to as microsystems comprising analysis and fractionation means. Such microsystems eliminate the constraints set forth above.

The fractionation techniques developed may be broken down into two categories:

passive fluidics techniques that mainly use segregation by size. These techniques are described as passive because the unique motor for the separation is the flow of the fluid;

active fluidics techniques: they combine fluidics with the use of a physical force which takes advantage of the intrinsic and specific physical properties of the cells such as the density, the dielectric characteristics, or instead the magnetic behaviour.

These techniques are especially disclosed in the following scientific articles: PAMME, N. (2007) "*Continuous flow separations in microfluidic devices*", Lab on a Chip, 7 1644-4659"; TSUTSUI, H and HO, C. M (2009) "*Cell separation by non-inertial force fields in microfluidic systems*", Mechanics Research Communications, 36, 92-103.

However, these techniques only make it possible to fractionate highly diluted volumes of samples, injected at very low flow rates and with not very important volumes (typically of the order of several tens of μL). The analysis means, although very efficient, of microsystems comprising analysis and fractionation means are thus limited by the available volume of fractionated sample.

In order to illustrate this limitation intrinsic to microsystems comprising analysis and fractionating means, it will be noted that the current sensitivity threshold for a test for detecting the AIDS virus by quantitative PCR is 20 pathogens for a 2 ml sample. It will then be understood that a fractionation on a volume of several tens of μL is insufficient for the analysis means of the microsystem comprising analysis and fractionation means, as efficient as they are, to provide significant results.

Consequently, the active or passive fractionation techniques developed are not suited to cases where the analyte is rare, which is frequent in the analysis of biological fluids.

The objective of the invention is then to be able to fractionate, using passive fluidics techniques and without going through a laboratory, an important volume of fluid containing particles into a first particle-lean volume of interest and into a second particle-rich volume of interest.

The invention also proposes a device able to fractionate a fluid containing particles and to extract a particle-free volume of interest which will serve as sample for a microsystem of the type comprising analysis means.

DESCRIPTION OF THE INVENTION

The present invention is defined by a device for the fractionation of a fluid containing particles and for the extraction of a particle-lean volume and of a particle-rich volume, said device comprising:

a cylindrical reservoir equipped at a first end with an inlet orifice intended to supply said reservoir with fluid in a direction of pumping from said first end toward a second end of the reservoir;

a fractionation body, extending along a central axis of said reservoir in which it is housed, between an upstream end and a downstream end, said upstream end of the fractionation body being positioned in vertical alignment above said inlet orifice, the cross section of said fractionation body reducing sharply in the region of said downstream end;

said fractionation body defining with said reservoir a first passage opening at said downstream end onto a zone with a geometric singularity designed to form a recirculation zone downstream of said downstream end; and extraction means, downstream of said fractionation body, intended to separate and extract said lean volume and said rich volume, said extraction means comprising a partition, for example an annular partition, delimiting an extraction volume intended, as fluid circulates in the direction of pumping, to receive a particle-lean phase formed in said recirculation zone in the region of said partition.

The partition is positioned downstream of the fractionation body, such that the rich liquid flows outside of this partition, that is to say between the latter and the inner wall of the reservoir, whereas the lean liquid can flow inside this partition, that is to say in the space delimited by said partition.

According to the invention, the cross section of the fractionation body reduces sharply at its downstream end. Sharply is taken to mean that the cross section of this body reduces, to become zero or negligible, this reduction taking place along a zero or small height, typically less than one tenth of the total height of the body, the latter being determined along an axis parallel to the direction of flow of the fluid along the fractionation body. In other words, the total height of the body is the distance between its upstream and downstream ends.

Generally speaking, the downstream end of the fractionation body forms the outlet of the first passage, which enables the formation of recirculation zones in the region of this base when the fluid flows from upstream to downstream, toward the extraction means.

The formation of such zones makes it possible to separate the liquid into:
a rich part of the liquid, flowing toward a means of extracting the rich volume, outside the partition; and
a lean part of the liquid, flowing toward a means of extracting the lean liquid, inside the partition.

Advantageously, the cross section of the body reduces along a zero height, the fractionation body then comprises a base, flat or substantially flat forming its downstream end.

Preferably, the cross section of the fractionation body increases between its upstream end and its downstream end.

Advantageously, the fractionation body is of axisymmetric shape, and also advantageously substantially paraboloidal. This limits turbulences in the first passage which is then annular, and enables a first separation between a rich phase and a lean phase of the liquid in the first passage, upstream of the outlet.

Preferably, the cross section of the fractionation body has a truncated ogive shape. More precisely, its cross section is substantially increasing between its upstream end and an intermediate zone, situated upstream of the downstream end. It is substantially constant between the intermediate zone and the downstream end. This makes it possible to generate laminar flow in the first annular passage.

In a first embodiment of the invention, the extraction means are fixed and are inserted in part into the reservoir in a hollowing out formed in the base of the fractionation body.

In a second embodiment of the invention, the extraction means are removable and intended to be inserted in part into the reservoir in a hollowing out formed in the base of the fractionation body.

Preferably, said partition comprises a plurality of through orifices formed in the region of said recirculation zone, said orifices defining a diameter less than the average diameter of the particles to act as filters of said particles, for the extraction of said lean volume in said extraction volume.

The extraction means may advantageously act as means of pumping the fluid, the latter then flowing from an upstream end to a downstream end of the fractionation body. Thus, these extraction means act both as admission means of the fluid in the reservoir and as extraction means of the rich fluid and of the lean fluid.

Advantageously, said extraction means preferably comprise a first piston moving between the inner wall of said reservoir and said partition, to recover said rich volume, and a second piston moving in a space delimited by said partition, to recover said lean volume, said first and second pistons moving from an initial position in a direction from said first end toward a second end of said reservoir, called direction of pumping or direction of flow, to create vortexes in said recirculation zone situated at the outlet of said first passage.

This makes it possible to suck the liquid up into the device, while enabling the extraction of the rich volume and the lean volume. These first and second pistons may be integral.

According to a first variant, the first and second pistons are made from a single part.

According to a second variant, the movement of said second piston is integral with that of said first piston in a direction going from the first end toward the second end of said reservoir, said second piston being able to be separated from said first piston and moved independently of said first piston in a direction from said second end toward said first end of said reservoir in order to expulse a potential residual rich volume present in the reservoir. The risk of plugging potential openings formed in the partition is then limited.

Advantageously, the second piston may comprise a bellows at its end. This makes it possible to limit a potential adherence between this piston and the fractionation body when this end is placed in contact with the fractionation body.

Advantageously, the first piston comprises a flange positioned along said partition, said flange being able to free successively said orifices as a function of the stroke of said first piston in a direction from said first end toward said second end of said reservoir.

In an advantageous embodiment of the fractionation body, it is equipped with a plurality of fins fixed on its surface, between its upstream end and its downstream end, each fin extending between the surface of the fractionation body and the inner wall of the reservoir, such that the space separating said inner wall of the reservoir and the fractionation body is split into a plurality of second passages, each second passage being delimited by two adjacent fins.

Preferably, two adjacent fins delimiting a second passage form an acute angle between them.

Thus, the particles flowing in a second passage are pushed back from said acute angle, such that they concentrate at a distance from this angle, near to the inner wall. This makes it possible to obtain a concentration of particles opposite a zone where the spacing between the fins is minimal as said fluid flows in the second passage. Thus, a first separation is obtained between a lean phase of the fluid and a rich phase of the fluid in the passage delimiting the fractionation body, upstream of the zones of formation of re-circulations.

According to one embodiment, the cross section of a second passage, that is to say the section transversal to the direction of flow of said fluid, called straight section, is of triangular shape.

According to one embodiment, the thickness of the fins is increasing from said upstream end toward said downstream end of the fractionation body and/or the acute angle formed by said fins forming a second passage is decreasing from said upstream end toward said downstream end.

According to one embodiment, each second passage is twisted with respect to an axis parallel to the direction of flow of said fluid.

The device according to the invention may be used to fractionate a blood sample between a volume of globule-lean plasma, for example red globules, and a volume of globule-rich blood, for example red globules, and to recover said volume of plasma.

BRIEF DESCRIPTION OF THE DRAWINGS

Other characteristics and advantages of the invention will become clear from reading a preferential embodiment of the invention made with reference to the appended figures, among which.

DETAILED DESCRIPTION OF PARTICULAR EMBODIMENTS

Figure 1:
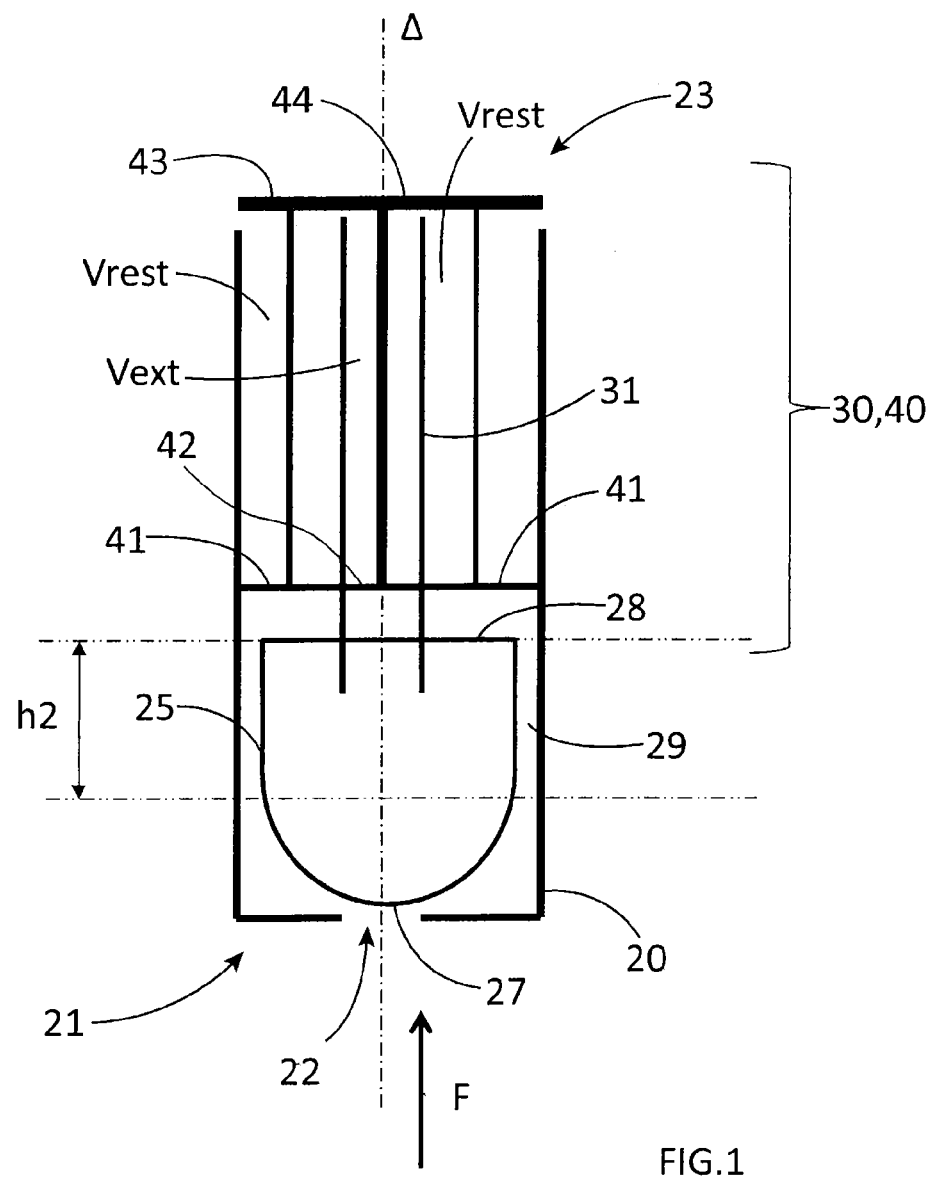
FIG. 1 illustrates schematically the fractionation and extraction device according to the invention.

FIG. 1 illustrates the conception, according to the invention, of a device for the fractionation of a fluid F containing particles, and for the extraction of a first particle-lean fluid volume of interest, and of a second particle-rich fluid volume of interest.

More precisely, the device according to the invention comprises a cylindrical reservoir 20, thus having axisymmetric geometry, equipped at its first end 21 with an inlet orifice 22 intended to supply the reservoir with fluid F containing particles when means of admission of the fluid, such as pumping means, are actuated.

Axisymmetric is taken to mean that the shape of the reservoir 20 is symmetrical by revolution around a central axis $\Delta$. The flow of a fluid in the reservoir then has axisymmetric properties.

The reservoir 20 is for example a tube of aspect ratio 1 to 5, the longest dimension of the reservoir 20 being along its central axis $\Delta$. The reservoir may be for example a syringe of length comprised between 5 cm and 10 cm, of diameter of the order of 1 cm to 3 cm and of which the inlet orifice has a diameter of the order of 0.1 mm to 0.5 mm.

Advantageously, the volume of the reservoir 20 is of the order of several milliliters to several tens of milliliters, which makes it possible to treat significant volumes of fluid. The fractionation and extraction device according to the invention is in this case a milli-system.

Figure 2:
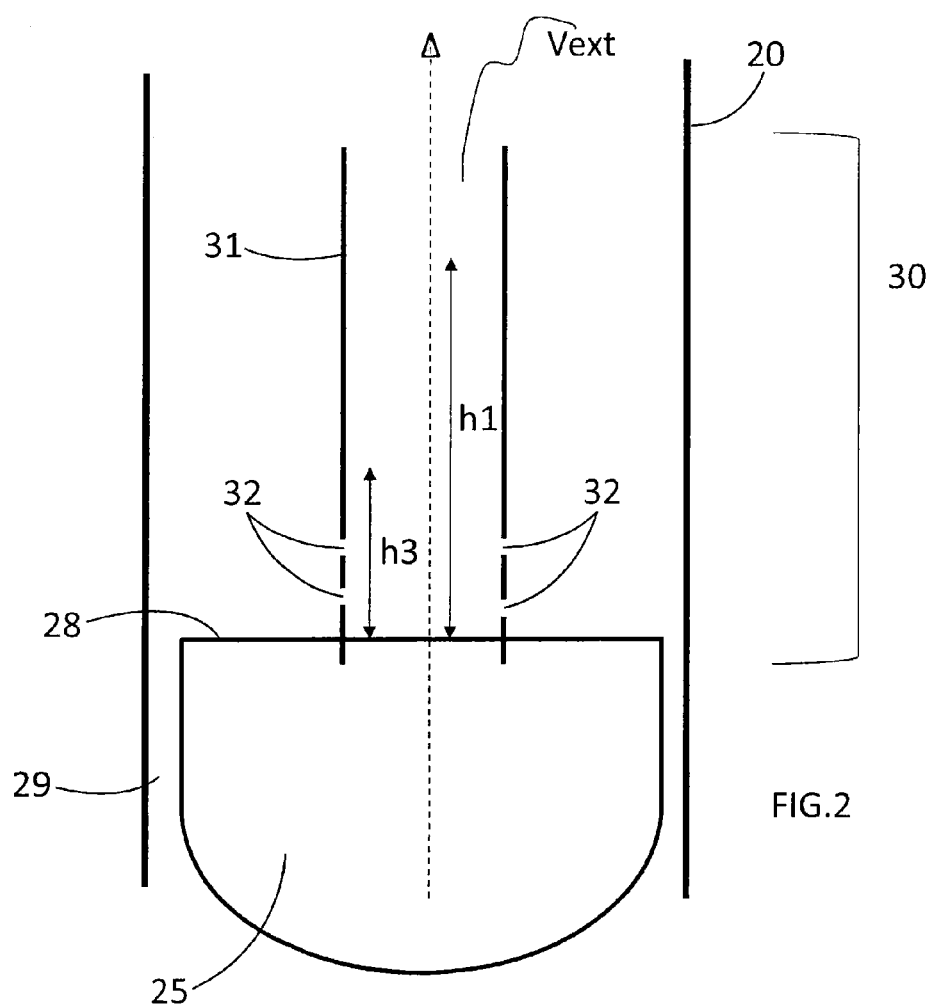
FIG. 2 illustrates schematically the device according to the invention in a first embodiment of the extraction means.
Figure 3:
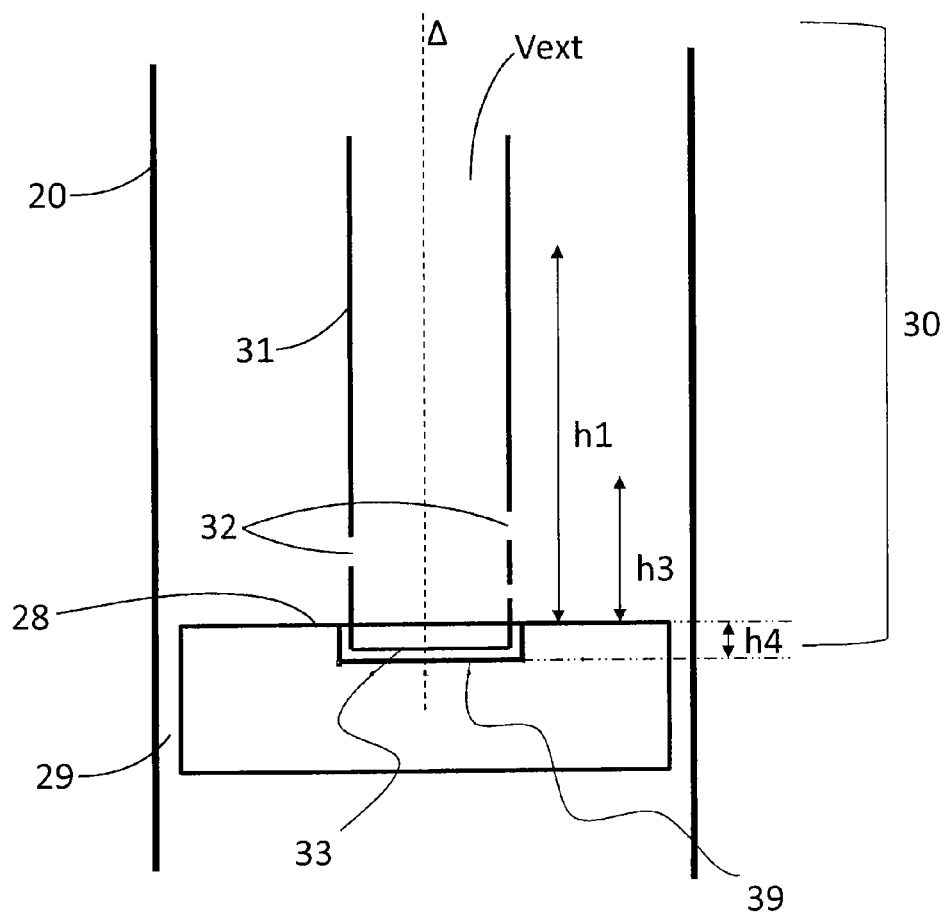
FIG. 3 illustrates schematically the device according to the invention in a second embodiment of the extraction means.

According to the invention, the reservoir 20 comprises a fractionation body 25 placed consequently downstream of the inlet orifice 22, and extraction means 30, 40 (see FIGS. 2,3).

The fractionation body 25 inserted into the reservoir makes it possible to create a zone of restriction of the annular flow in the case where a fluid F containing particles is pumped through the inlet orifice 22 using pumping means, and flows in steady state into the reservoir, in a direction going from a first end 21 of the reservoir 20 toward a second end 23 of the reservoir.

By convention, in the remainder of the description, direction of pumping will designate the direction going from a first end 21 of the reservoir 20 toward a second end 23 of the reservoir, and direction of flushing the direction going from the second end 23 of the reservoir toward the first end 21 of the reservoir.

The pumping means which may be used to supply the reservoir 20 with fluid F are traditional pumping means, such as electric micro-pumps. These means, well known to those skilled in the art, will not be described in detail in the present description.

On the other hand, in particular variants of embodiments of the device according to the invention which will be described hereafter in the description (see FIGS. 4 and 5), the extraction means 40 may advantageously act as means of pumping the fluid F, thereby conferring a compact character to the fractionation and extraction device according to the invention.

The fractionation body 25 extends along the central axis $\Delta$ between an upstream end 27 and a downstream end, and is placed at the outlet of the inlet orifice 22. The upstream end 27 of the fractionation body is positioned in the region of the inlet orifice 22.

Preferably, the inlet orifice 22 is positioned at the first end of the reservoir such that its centre is situated on the central axis $\Delta$ of the reservoir and the upstream end 27 of the fractionation body is positioned in vertical alignment above the inlet orifice 22.

The space situated between the inner wall of the reservoir and the fractionation body 25 forms a passage 29 which extends along the axis of symmetry $\Delta$ and which emerges in the region of the downstream end of the fractionation body to form a recirculation zone.

The fractionation body 25 is preferably a solid body, so that all the fluid introduced into the inlet orifice 22 flows into the annular passage, along the fractionation body, up to its downstream end.

According to the invention, the cross section of the fractionation body 25 reduces sharply at its downstream end.

Sharply is taken to mean that the cross section of this body reduces, to become zero or negligible. This reduction takes place along a zero or small height, typically less than one tenth of the total height of the fractionation body 25, taken between its upstream and downstream ends.

At the outlet of the restriction zone, that is to say at the outlet of the passage 29, the cross section in which a fluid can transit widens sharply. The reservoir 20 in which is housed the fractionation body 25 thus has a zone with a geometric singularity conductive to generating a phenomenon of recirculation.

In the case where a fluid F containing particles flows, in steady state and in the direction of pumping, into the reservoir 20 in which is housed the fractionation body 25 according to the invention, the phenomenon leads to the appearance of vortexes known as dead volumes confined in the recirculation zone, at the outlet of the passage 29, in the spot where the section widens sharply.

In the preferential embodiment of the invention which is described and illustrated in FIGS. 1 to 13, the cross section of the body reduces along a zero height. The fractionation body then comprises a base 28, flat or substantially flat, forming its downstream end. The flat base 28 of the fractionation body 25 is formed by the straight section of its downstream end.

In this case, the fractionation body 25 has a shape such that a surface of the straight section at its upstream end 27, called upstream section, is less than or equal to the surface of its base 28.

The surface of the flat base 28 is the maximum surface whereas the surface of the upstream section is the minimum surface, these two surfaces being able to be equal.

Advantageously, the fractionation body is of asymmetric shape in order to limit turbulences in the passage 29 which is then annular, and to enable a first separation between a rich phase and a lean phase of the fluid F at the outlet of the annular passage 29.

In the remainder of the description, it is considered that the fractionation body 25 is of axisymmetric shape.

The fractionation body 25 housed in the reservoir 20 is supported and maintained in position, for example, by maintaining means known to those skilled in the art and which will not be described here in further detail.

FIG. 2 and FIG. 3 illustrate schematically the device according to the invention according to different embodiments, with an enlargement of the view centred on the base 28 of the fractionation body 25. The remainder of the description will now be described in relation with FIGS. 1 to 3.

The recirculation zone is defined as being the space going from the downstream end 28 of the fractionation body 25 up to a height noted h1. The height h1 is the wake height of the fractionation body beyond which the phenomenon of recirculation becomes less marked. In other words, beyond the height h1, the particle-lean fluid volume remixes with the particle-rich fluid volume.

In the dead volume vortexes that are created in the recirculation zone, the particles tend to be ejected by a centrifugal force according to their density.

More particularly, each particle is subjected to two opposing forces: a centrifugal force which tends to move it away from the centre of the vortex and a lift force that moves it away from the inner wall of the reservoir 20. For a particle of which the mass is sufficiently important, the centrifugal force predominates over the lift force, thereby leaving a particle-lean zone at the centre of the vortex and next to the inner wall of the reservoir 20.

In the case of blood, the high density and average volume of the red globules and white globules means that these are ejected outside of the vortex.

In order to optimise the phenomenon of recirculation and thus the separation of the particles, the section of the fractionation body 25 is increasing between its upstream end 27 and its downstream end 28. In fact, such a decrease makes it possible to limit turbulences at the inlet of the passage 29, in the region of the upstream end 27 of the fractionation body 25 and thus to favour phenomena of distribution of particles inside the annular passage 29 as a function of their weight, as is known to those skilled in the art.

Thus, the fractionation body 25 has an axisymmetric paraboloidal shape or preferentially a truncated ogive shape in order to generate laminar flow in the annular passage. Truncated ogive is taken to mean that the fractionation body has a straight section substantially constant over a height comprised between its downstream end 28 and a straight section of an intermediate zone situated at a height h2 defined from its downstream end and substantially increasing between its upstream end 27 and the intermediate zone.

The height h2 is, in the case of blood, of the order of 1 to 50 mm such that the distribution profile of the globules in the annular passage 29 is homogenous and stabilised. Such a distribution profile in a passage is for example described in the published patent application FR 2 931 079.

Preferably, the height of the fractionation body between its top 27 and its base 28 is comprised between ¼ and ¹⁄₁₀ of the height of the reservoir 20 and the space between the base 28 and the inner wall of the reservoir is comprised between several tens of µm to several hundreds of µm as a function of the size of the particles contained in the fluid to be fractionated.

In the case where the fluid F to be fractionated is blood, the space between the outer surface of the fractionation body 25 in the region of its base 28 and the inner wall of the reservoir is then comprised between 50 µm and 1 mm.

Under the action of pumping the fluid F containing particles into the reservoir in the direction of pumping, the extraction means 30, 40, which are situated downstream of the fractionation body 25, make it possible to extract the lean volume and the rich volume and to recover the particle-lean phase. With this aim, the extraction means 30, 40 comprise a partition 31 delimiting an extraction volume $V_{ext}$. This partition leans on the base 28 when it is wished to fill at least a part of the fluid volume $V_{ext}$ with a particle-lean fluid volume of interest.

At the outlet of the fractionation body 25 and in the case where a fluid F containing particles is pumped through the inlet orifice 22 and flows in steady state in the direction of pumping into the reservoir, the particles taken in the vortexes are subjected both to the centrifugal force that tends to move them away from the centre of the vortex and to a lift force which moves them away from the inner wall of the reservoir 20 and from the outer wall of the partition 31 of the extraction means 30, 40. In the recirculation zone, there thus exists a particle-lean zone at the centre of each vortex and next to the inner wall of the reservoir but also the partition 31. It is then possible to recover the particle-lean phase in the region of the partition 31 situated in the wake of the fractionation body 25.

Advantageously, the partition 31 is annular (cylindrical) and thus having axisymmetric geometry. The partition 31 preferably has an axis of symmetry which is merged with the central axis Δ of the reservoir in order to enable a homogeneous distribution of the vortexes around it and thus to optimise the extraction of the particle-lean fluid volume.

In the example of the invention described in the present description, the extraction means 30, 40 may be realised according to two different embodiments.

The remainder of the description will now be described in relation with FIG. 1 and FIGS. 2 to 3.

FIGS. 2 and 3 illustrate the device according to the invention, according to a first and a second embodiment of the extraction means 30, 40 respectively.

In a first embodiment of the extraction means 30 illustrated in FIG. 2, the partition 31 is fixed in an irremovable manner in the fractionation body 25 in the region of the base 28. In this case, the fractionation body seals one end of the partition. Thus, the partition 31 clearly delimits an extraction volume $V_{ext}$.

In order to make the particle-lean phase penetrate into the extraction volume $V_{ext}$, the partition 31 is drilled with a plurality of through orifices 32. These orifices are formed from the downstream end 28 of the fractionation body 25 up to an extraction height, noted h3, less than the height h1 of the recirculation zone in order to guarantee maximum efficiency. In fact, the phenomenon of recirculation tends to abate as one moves further from the base 28.

In the second embodiment of the extraction means 30 illustrated in FIG. 3, the partition is sealed in a leak tight manner at its first end 33 which is the closest to the downstream end 28 of the fractionation body 25. The partition 31 thereby sealed clearly delimits an extraction volume $V_{ext}$.

In this case, the extraction means 30 are then provided to be inserted without clearance, via the first end 33 of the partition 31, in a hollowing out 39, preferably cylindrical, having for centre the axis of symmetry Δ of the fractionation body 25 and of height h4 which is formed in the region of the base 28 of the fractionation body. The height h4 and the radius of the hollowing out 39 are chosen such that the partition, when it is inserted in part into the hollowing out 39, has an axis of symmetry merged with the axis Δ.

The partition 31 then comprises a plurality of through orifices 32 situated in the region of the recirculation zone to make the particle-lean volume of interest penetrate into the extraction volume $V_{ext}$. The orifices 32 are formed on the partition 31 up to the extraction height h3 and are drilled such that when the partition is inserted into the hollowing out 39, the height between the first orifices 32 and the first end 33 of the partition is greater than the height h4 of the hollowing out 39.

The partition may be separated from the fractionation body 25 and be removed from the reservoir 20 when an operator estimates that the extraction volume contains a sufficient particle-lean fluid volume. To this end, the operator then just has to extract the partition 31 from the reservoir 20 through the second end 23 of the reservoir. This manipulation is described hereafter in the description in relation with FIG. 7.

In the two embodiments of extraction means described previously, the orifices 32 formed on the partition are preferably uniformly spread out both over the extraction height h3 and over the whole periphery of the partition 31.

In order to further reduce the penetration of the particles through the orifices 32, the diameter of the orifices could be dimensioned in order that it is less than the average diameter of the particles, thereby conferring to the orifices 32 a filtering function.

Advantageously, the extraction means 30, 40 can act as means of pumping the fluid F, the latter then flowing, from an upstream end to a downstream end of the fractionation body. Thus, these extraction means 30, 40 act both as means of admission of the fluid into the reservoir and means of extraction of the rich fluid and of the lean fluid.

Thus, in variants of the two embodiments described previously, the extraction means 30, 40 comprise mechanical pumping means coupled to the partition 31 and the movement of which makes it possible to make the fluid F flow in the reservoir, either in the direction of pumping or in the direction of flushing.

Figure 4:
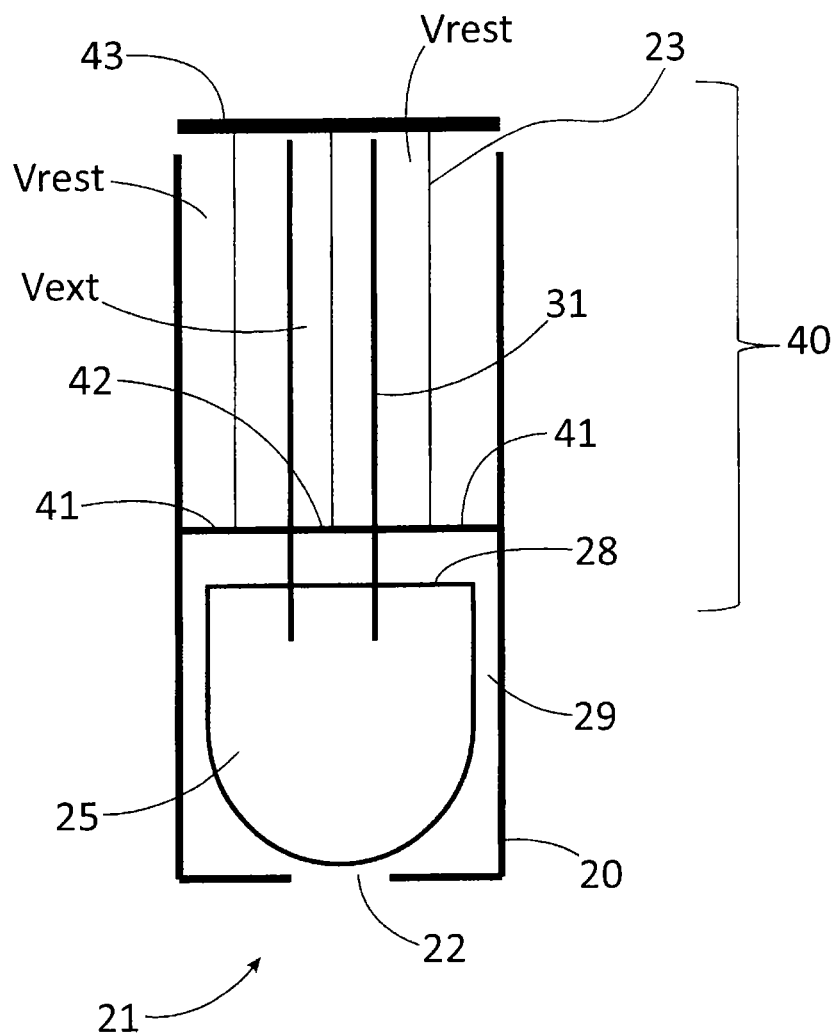
FIG. 4 illustrates schematically the device according to the invention in a first variant of embodiment of the extraction means.
Figure 5:
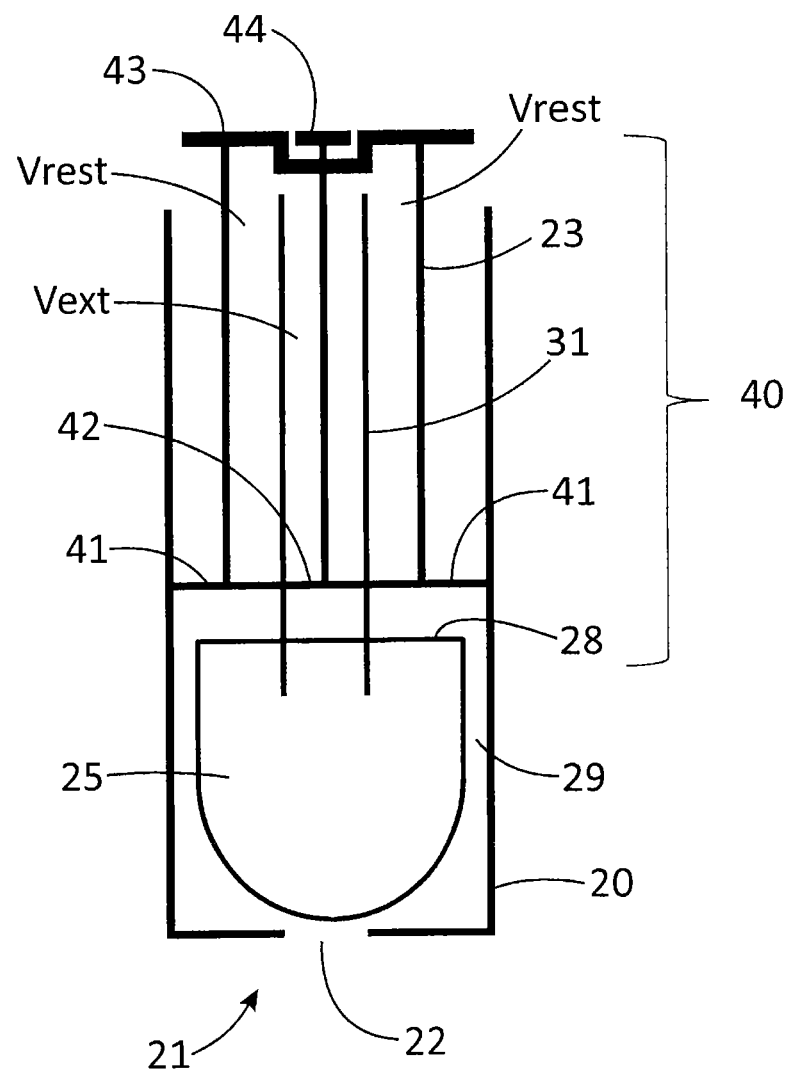
FIG. 5 illustrates schematically the device according to the invention in a second variant of embodiment of the extraction means.
Figure 6:
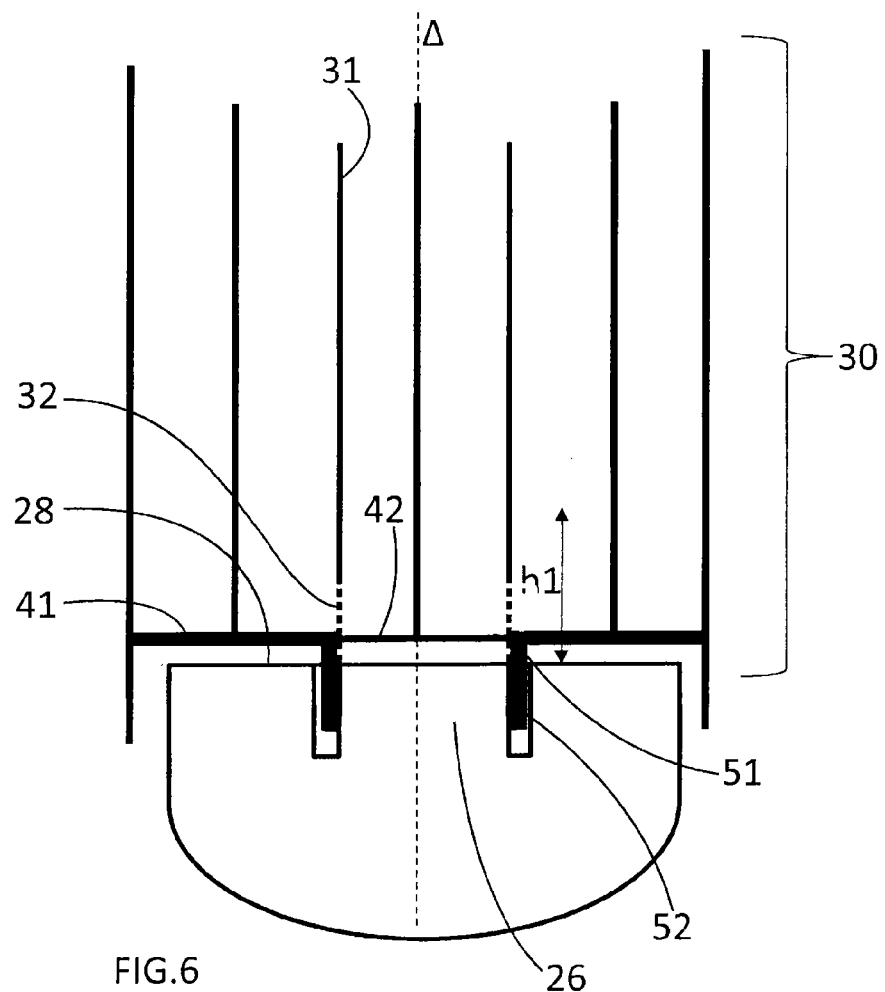
FIG. 6 illustrates schematically the implementation of a flange on the partition of the extraction means, according to the invention.

FIGS. 1, 4 and 5 illustrate the device according to the invention, when mechanical pumping means are coupled to the partition 31. FIG. 4 illustrates a first variant of the extraction means 30, 40 when they comprise mechanical pumping means, whereas FIG. 5 illustrates a second variant thereof.

In a manner common to these two variants, the extraction means 30, 40 comprise a first piston 41 of annular shape moving in the volume $V_{rest}$ comprised between the total volume $V_{tot}$ and the extraction volume $V_{ext}$, that is to say between the inner wall of the reservoir 20 and the outer wall of the partition 31 of the extraction means 30, 40. They further comprise a second piston 42 moving in the extraction volume $V_{ext}$, that is to say in the space delimited by the inner wall of the partition 31.

In its initial position, that is to say before the fractionation of the fluid F containing particles is implemented by the device according to the invention, the first piston rests on the base 28 and assures a leak tight separation between, on the one hand, the volume situated between the first end 21 of the reservoir 20 and the base of the fractionation body and, on the other hand, the volume situated between the flat base 28 of the fractionation body 25 and the second end 23 of the reservoir. In an initial state, the volume situated between the first end 21 of the reservoir 20 and the base 28 of the fractionation body 25 is advantageously placed under vacuum, thanks for example to the presence of a seal sealing the inlet orifice 22.

In the two variants of the extraction means 30, 40 according to the invention, the operation of the pistons to pump a fluid containing particles into the reservoir in the direction of pumping is the same.

In fact, in order that the fluid moves in the direction of pumping, the first piston moves from an initial position in a direction from said first end 21 to a second end 23 of the reservoir to create a permanent flow of fluid and thus enable the formation of vortexes in the recirculation zone situated at the outlet of said passage. The movement of the second piston enables for its part the penetration of said first fluid volume of interest into the extraction volume $V_{ext}$ through the plurality of through orifices 32.

The movement of the first and the movement of the second pistons are then integral in the direction of pumping. Advantageously, the first and the second pistons are situated in the same plane.

In the first variant illustrated in FIG. 4, the command 43 of the first piston 41 is integral with the command 43 of the second piston 42, which implies that the two pistons 41, 42 move in an identical and simultaneous manner both along the direction of pumping and along the direction of flushing. Thus, the first and second pistons may for example be made from a single part.

The command 43 of the two pistons is situated in the region of the second end 23 of the reservoir 20. An operator, when he acts on the command of the two pistons 41, 42, can generate a flow in the reservoir 20 by modifying the stroke of the pistons. By acting on the command 43 of the pistons such that these have a stroke along the direction of pumping, the operator can generate a flow of the fluid along the direction of pumping to fractionate the fluid by means of the fractionation body and recover the particle-lean fluid volume which is contained in the extraction volume $V_{ext}$. The operator (human or machine) can also generate a flow of the fluid along the direction of flushing to flush the fluid contained in the reservoir 20 and the partition 31 by acting on the command 43 of the pistons 41, 42 such that these have a stroke along the direction of flushing.

In the second variant illustrated in FIG. 5, the movement of the second piston 42 is identical and simultaneous with that of the first piston 41 according to the direction of pumping since the command 44 of the second piston 42 is integral with that of the first piston 41 in this case. On the other hand, the first piston 41 may be separated, thus moved independently of the second piston 42 in a piston stroke along the direction of flushing since the command 43 of the first piston 41 may then be separated from that of the second piston 42 in this case. Thus, it is possible to flush the particle-rich volume of interest contained in the volume $V_{rest}$ at the end of the fractionation and extraction process while conserving the particle-lean fluid volume collected inside the partition 31.

To do so, one proceeds as follows: when the stroke of the first 41 and second pistons 42 is maximal along the direction of pumping, that is to say, when the volume $V_{ext}$ comprised within the partition 31 contains the maximum (or desired) recoverable quantity of particle-lean fluid volume, the command 43 of the first piston 41 is separated from that 44 of the second piston 42 and one acts uniquely on the command 43 of the first piston 41 to move it along the direction of flushing.

One thus avoids, at the end of the fractionation and extraction process, pollution of the extraction volume $V_{ext}$ by particles and one thus avoids plugging of the orifices 32 by particles, preventing or limiting the processes of fractionating volumes of fluid. In fact, during the fractionation process, that is to say when the first 41 and the second 42 pistons have a stroke in the direction of pumping, particles can block the orifices 32 and perturb the correct operation of the device. This is all the more true when the dimensioning of the orifices is provided to filter the particles.

The two variants described previously are compatible with the first or second embodiments of the extraction means 30, 40.

Advantageously, the first piston 41 comprises a flange 51 which is positioned along the outer wall of the partition 31 of the extraction means 30, 40. The flange 51 laps against the outer wall of the partition 31 such that the orifices 32 comprised in the recirculation zone and spread out uniformly along the height h1 are freed successively as a function of the stroke of the first piston 41, when the piston 41 is moved along the direction of pumping.

As will be explained in the remainder of the description and in relation with FIG. 13, the flange 51 imposes a delay time for the successive opening of the orifices 32 spread out on the partition 31 depending on the height h1 of the recirculation zone.

The fractionating body 25 may comprise a trench 52 formed in the region of the base 28 into which the flange 51 inserts when the first piston 41 has a minimum stroke along the direction of pumping, that is to say when it rests on the base 28.

Preferably, the second piston 42 comprises a bellows 53. The bellows 53 seal off, from the inside of the wall 31, the orifices 32 at the start of the stroke of the second piston 42 along the direction of pumping and serve to prevent the appearance of air bubbles which can appear before the establishment of re-circulations at the start of the process of extraction of the particle-lean fluid volume.

In the case where the extraction means 30, 40 are realised according to the second embodiment, it is possible to extract the extraction volume $V_{ext}$ automatically outside of the reservoir 20 when the method of fractionating and extracting the fluid F comprising the particles is completed. It is then preferable that the extraction means 30, 40 are realised according to the second variant in order to be able to extract simply the removable partition 30.

Figure 7:
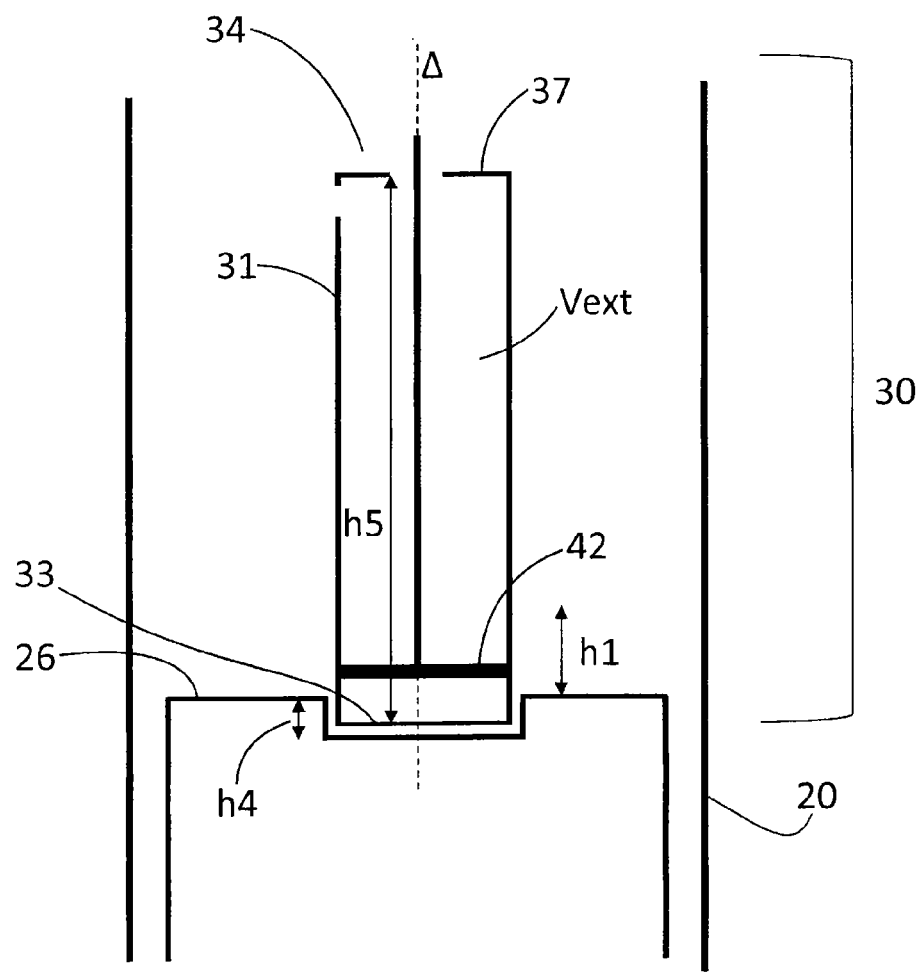
FIG. 7 illustrates schematically the principle of collection of the extraction volume in the second embodiment of the extraction means according to the invention.

To this end, FIG. 7 illustrates schematically the principle of collection of the extraction volume $V_{ext}$. In FIG. 7, only the removable extraction means 30, 40, the reservoir 20, the removable partition and the second piston 42 have been represented in order not to overburden the figure.

More precisely, the partition 31 comprises a means of attachment 37 which is positioned such that the second piston 42 attaches to the means of attachment at the end of a certain height h5 of stroke along the direction of pumping. Thus, when an operator moves the piston 42 along the direction of pumping, it is possible at the end of a certain piston stroke, to remove the extraction means 30, 40 from the reservoir 20 and thus to recover the extraction volume $V_{ext}$. The means of attachment may be for example a collar fixed on the inner wall of the partition 31 at a height h5 with respect to the first end 33 of the partition.

Preferentially, and as illustrated in FIG. 7, the second end 34 of the partition acts as means of attachment 37 of the extraction means. The second end 34 is then drilled in its centre to allow the rod of the second piston 42 to pass through and allow air to pass through in order to exploit the principle of suction which enables the penetration into the extraction volume $V_{ext}$ of the particle-lean fluid volume through the orifices 32 situated in the recirculation zone when the second piston 42 is moved along the direction of pumping.

The partition 31 may comprise at least one through drilling (or orifice), in the region of the second end 34 of the partition, to allow more air to get through.

The remainder of the description aims to detail an advantageous embodiment of the fractionation body 25. In fact, it is possible to improve the device described in relation with FIG. 1 in order to optimise the collection of the first particle-lean fluid volume of interest in the extraction volume $V_{ext}$. To do so, the fractionation body 25 is equipped with a plurality of fins 4,5 fixed on its outer surface, between its downstream end 28 and its upstream end 27.

Along a straight section of the fractionation body 25, each fin extends between the surface of the fractionation body and the inner wall of the reservoir, such that the space separating the inner wall of the reservoir of the fractionation body is split into a plurality of fractionation passages, each fractionation passage C being delimited by two adjacent fins 4,5.

Preferably, two adjacent fins delimiting a fractionation passage C form, between them, an acute angle α.

Along the central axis Δ, the fins extend over the height of the fractionation body 25. They can extend over the totality of its height, that is to say between its upstream end 27 and its downstream end 28, or instead uniquely on a part thereof, chosen sufficiently large such that the effect provided by the fins, and detailed hereafter in the description, takes place.

Consequently, a pair of fins 4,5 having an acute angle α between them, form the section S of a fractionation passage C, in a plane transversal to the direction of flow of the fluid in the annular passage 29.

The section S is delimited by the two fins and the arc of a circle formed on the surface of the fractionation body 25 between the two fins 4,5 and the arc of a circle formed on the inner wall of the reservoir 20 between the two fins 4,5.

Consequently, when a plurality of pairs of fins having an acute angle α between them are positioned on the outer surface of the fractionation body 25, the section of the annular passage 29 is split into several fractionation passages C. A pair of fins 4,5 having an acute angle α between them then forms the side walls of a fractionation passage C.

The interest of splitting the annular passage 29, called first passage, into a plurality of fractionation passages C, called second passages, makes it possible to combine a clear layer effect that takes place in each of the passages C with the centrifugation effect of the heavy particles which takes place in the recirculation zone, at the outlet of the fractionation passages C.

In fact, thanks to the presence of the fractionation passages C between the fractionation body 25 and the inner wall of the reservoir 20, the invention exploits the formation of a zone of particle-lean fluid assured by the fractionation passages C, also known as clear layer, near to the walls of the passage and the effect of the recirculation zone at the outlet of the fractionation body 25.

Figure 8:
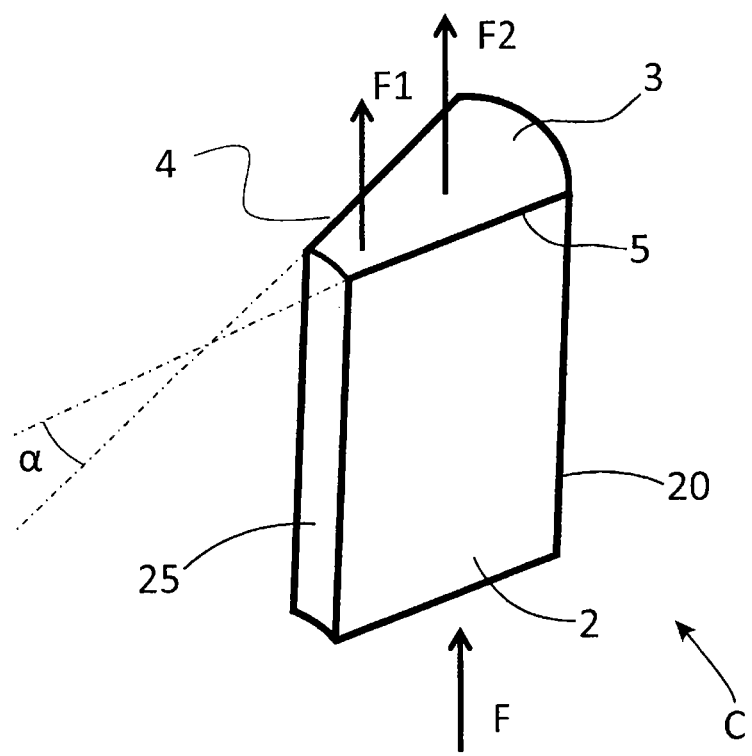
FIG. 8 illustrates schematically a fractionation passage according to the invention.

The formation of the clear layer will now be explained in relation with FIG. 8 which illustrates the detail of a fractionation passage C taken among a plurality of passages splitting the annular passage 29.

If it is assumed that a fluid F containing particles flows from an upstream end 2 toward a downstream end 3 of a fractionation passage C, a particle borne by the fluid F is subjected to two opposing forces: a force linked to a radial variation of the shear stress that existed in the flow before the introduction of the particle, and a force that results from inertial type interactions, with the walls (or fins forming the cells) of the fractionation passage C, of the flow perturbed by the presence of the particle.

The first force tends to bring it closer to the walls of the fractionation passage C whereas the second pushes it away therefrom. There exists a point close to the walls of the fractionation passage C where these two forces cancel each other out, which enables the particle to reach a point of equilibrium in its radial movement with respect to the direction of flow, while continuing to be swept along axially by the flow in the fractionation passage C.

Figure 9:
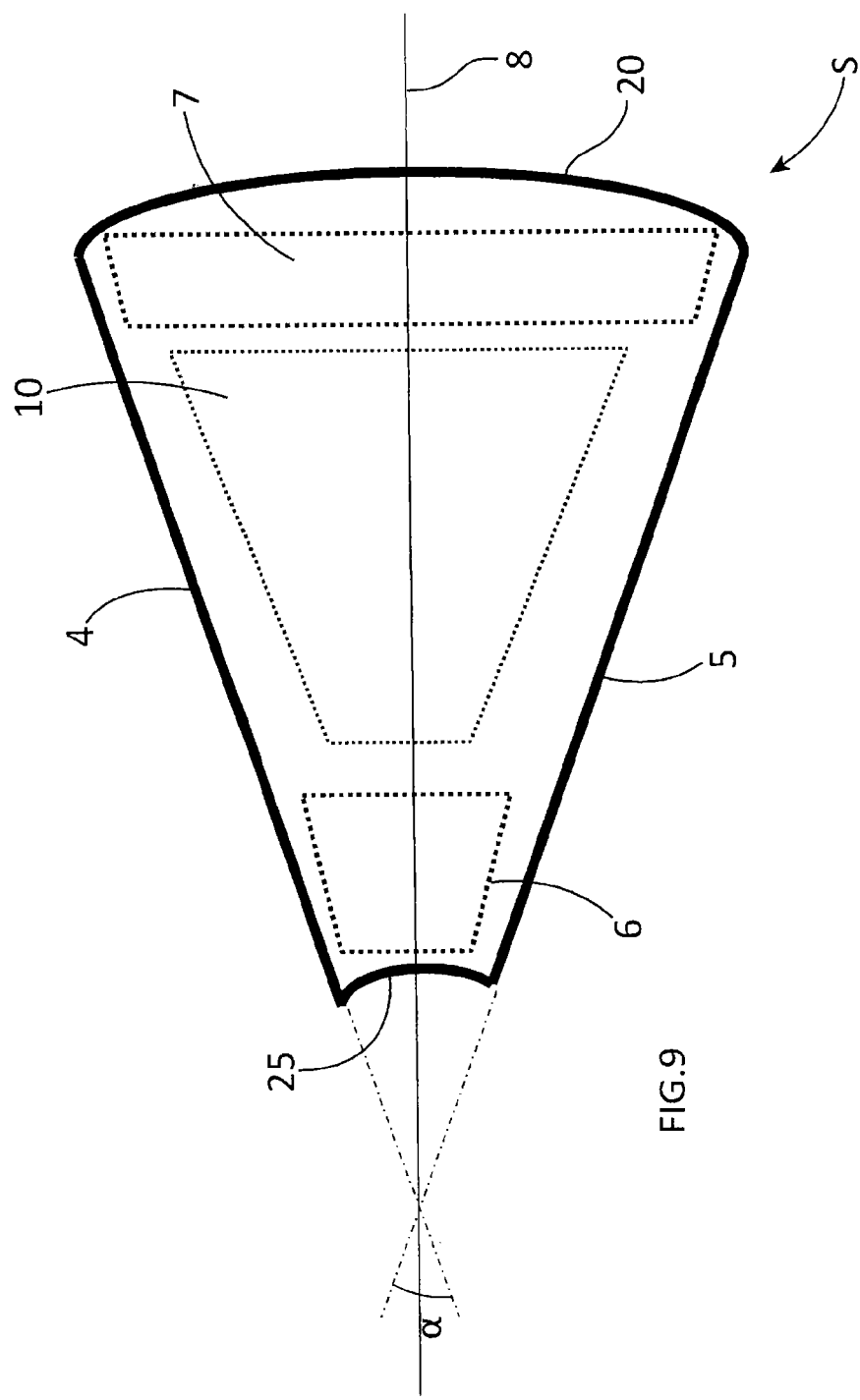
FIG. 9 is a schematic sectional view transversal to the direction of flow of the fluid of the cross section of a fractionation passage realised according to a first embodiment of the fractionation passages according to the invention.

The straight section of the fractionation passage C is illustrated in FIG. 9. It has been represented with a trapezoidal shape in the embodiment illustrated in FIGS. 8 and 9 without this being limiting.

The shape given to the section S of each fractionation passage C aims to push back the particles from the zone 6 where the spacing between the side walls 4,5 is minimal, while weakening the attractive forces due to the shear gradient in the flow and, consequently, to increase the proportion of the particle-lean volume in this zone 6.

In fact, a region of equilibrium 10 is going to appear in the vicinity of the bisecting line 8 of the acute angle α formed by the two side walls 4,5 of the fractionation passage C. The region of equilibrium 10 is situated between the zone where the spacing of the walls is maximal 7 and the zone where the spacing of the walls is minimal 6.

On account of the acute angle α formed by the side walls of the fractionation passage C, the region of equilibrium 10 is both more extended and further away from the zone 6 where the spacing of the walls is minimal than it is from the zone 7 where the spacing of the walls is maximal. In fact, along the bisecting line 8, the shear stress, in the absence of particles, drops more gradually towards the zone 6 where the spacing between the walls is minimal than towards the zone 7 where the spacing of the walls is maximal. Furthermore, the repulsive force that results from interactions of inertial type increases in a progressive manner as one approaches the zone where the spacing of the calls is minimal 6.

Therefore, it is possible to provide the formation of a bead concentrated with particles and the formation of an important mass of particles stretched out along the bisecting line 8 in the region of equilibrium 10. The region of equilibrium 10 is then a region with a high concentration of particles, moved away from the zone where the spacing of the walls is minimal, and surrounded by a particle-lean clear layer near to the walls.

Thus, in a fractionation passage C, the fluid is fractionated with precision into two fluid volumes. In the case where the fractionation body 25 is equipped at its periphery with a plurality of fractionation passages C and in the case where a flow of a fluid F containing particles takes place in the direction of pumping in the device according to the invention, it will be understood that at the outlet of the fractionation body 25, the particles, sufficiently massive and coming from the region of equilibrium 10 of each fractionation passage C, are concentrated on flow lines that open out on going from the restriction zone formed by the annular passage 29 to the wide section zone at the outlet of the fractionation body 25 without being affected by the phenomenon of recirculation. Thus, the fractionation passages C serve to optimise the phenomenon of recirculation by carrying out a prior fractionation of the fluid F containing particles.

The fractionation of a fluid containing particles by means of fractionation passages C as described previously may be improved by different possible structural configurations of the fractionation passages C, in order to move further the particle-rich region of equilibrium 10 towards the zone 7 where the spacing between the walls is maximal and, consequently, to increase the particle-lean fluid volume.

Thus, a first embodiment of the fractionation passages C, which also represents the simplest manner to optimise the fractionation, consists in forming the fractionation passages C such that their straight section is of triangular shape. To do so, the fins 4,5 of a fractionation passage C are fixed on the surface of the fractionation body 25 so that the spacing between the two fins 4,5 is practically zero in the region of the fixation on the fractionation body. A straight section of substantially triangular shape is thereby obtained, the base of the triangular section then being defined by the inner wall of the reservoir 20. This shape is doubly advantageous: in fact, the design of the fractionation passage C is simplified and the attractive forces due to the shear gradient are further weakened in the zone where the spacing between the walls is minimal 6.

Furthermore, when the fractionation body 25 has a paraboloidal shape or a truncated ogive shape, the passages C have a section transversal to the direction of flow of the fluid decreasing along the direction of pumping given the opening out of the fractionation body 25. Thus, when the fluid flows along the direction of pumping, the upstream end 2 of the passage C through which the fluid penetrates has a cross section transversal to the direction of flow larger than the cross section transversal to the direction of flow of the downstream end 3 of the passage C through which the fluid exits. The advantage of such a reduction in the cross section is to restrict the surface of the region of equilibrium 10 as the fluid progresses in the passage.

Furthermore, the paraboloidal or truncated ogive shape of the fractionation body 25, in addition to narrowing the cross section of the passages transversal to the flow of the fluid along the direction of pumping, creates a centrifugation effect which moves the particles away from the fractionation body 25 by moving the region of equilibrium 10 of the particles towards the inner wall of the reservoir 20. The particles are thus pushed back to the periphery of the reservoir 20, which facilitates the separation (and thus the extraction) of the particle-rich fluid volume and the particle-lean fluid volume.

The effect that has just been described may be accentuated by an advantageous design of the fractionation passages C, whatever the shape of the fractionation body 25. Thus, a second embodiment of the fractionation passages C consists in increasing the thickness of the fins 4,5 along the direction of pumping and/or reducing the acute angle α of each passage C along the direction of pumping.

This embodiment is compatible with the first embodiment.

Figure 11B:
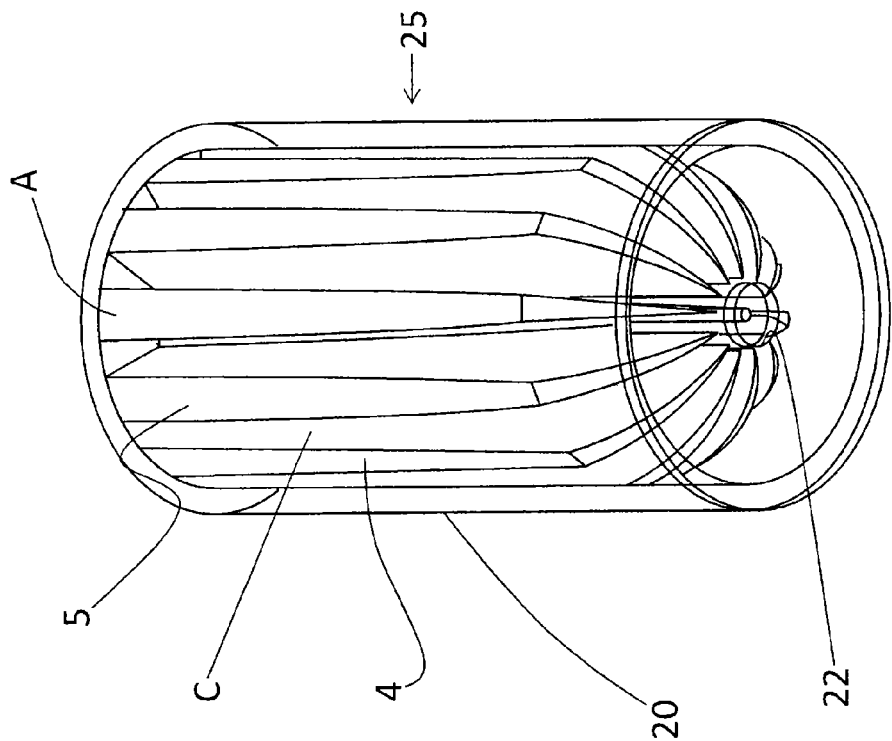
FIG. 11B illustrates a relief view of the fractionation body when the fractionation passages are realised according to the first and second embodiments of the fractionation passages according to the invention.
Figure 11A:
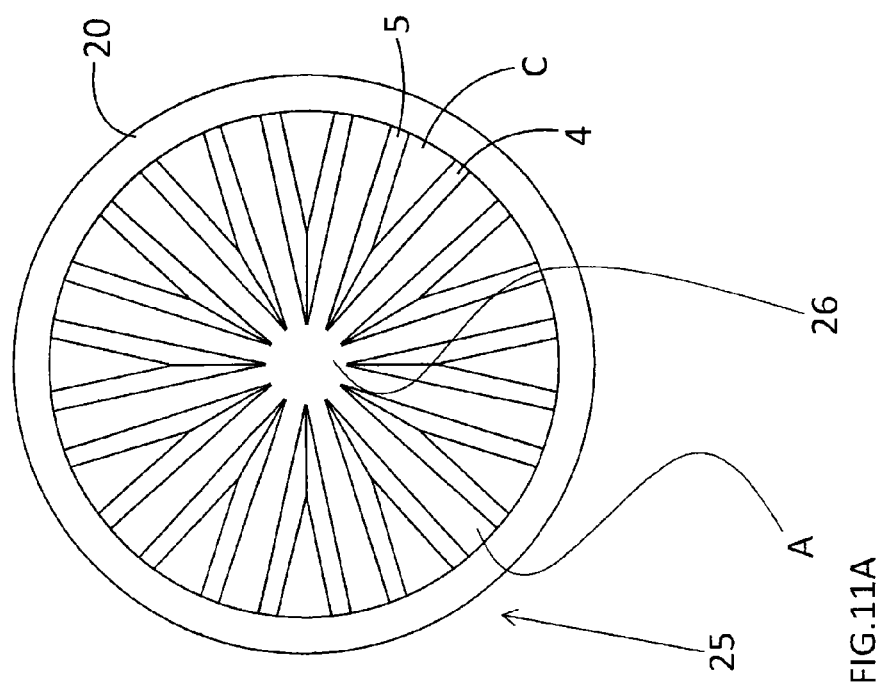
FIG. 11A illustrates a transversal sectional view of the fractionation body when the fractionation passages are realised according to the first and second embodiments of fractionation passages according to the invention.

FIG. 11A illustrates a transversal sectional view of the fractionation body when the fractionation passages C are realised according to the first and the second embodiments.

FIG. 11B illustrates a relief view of the fractionation body of the fractionation body in this same configuration of the fractionation passages C.

Figure 10:
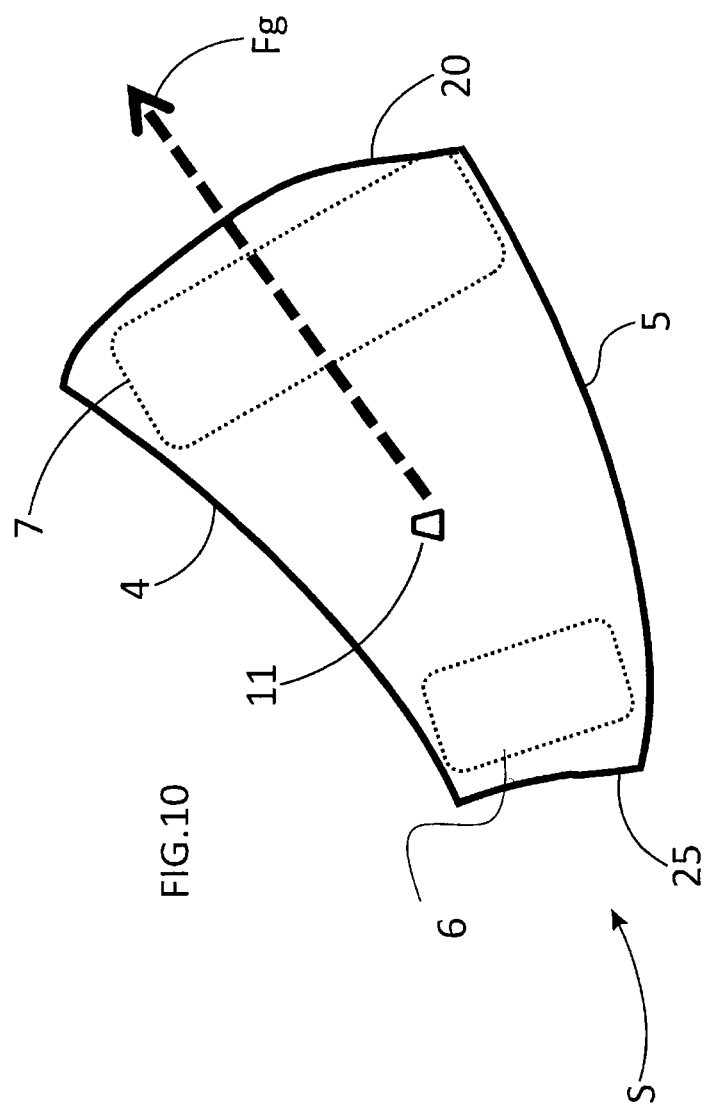
FIG. 10 is a schematic sectional view transversal to the direction of flow of the fluid of the cross section of a fractionation passage realised according to a third embodiment.
Figure 12:
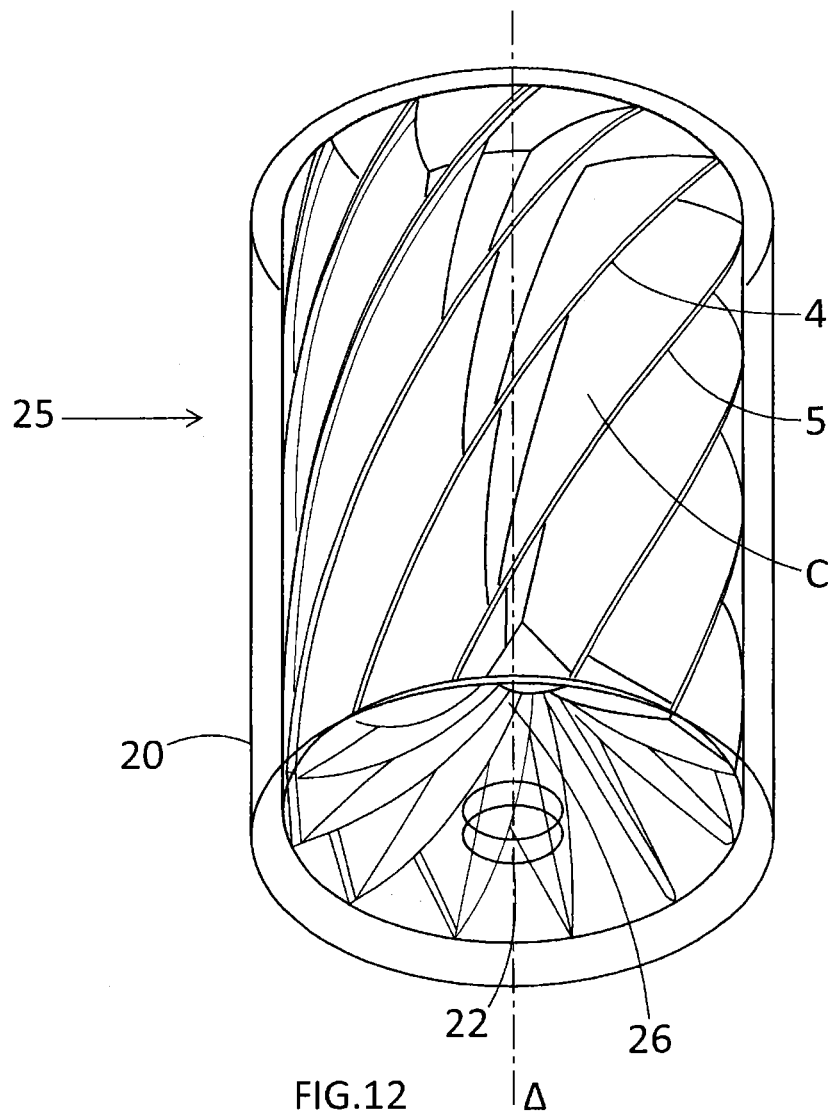
FIG. 12 illustrates a relief view of the fractionation body 25 when the fractionation passages are realised according to the third embodiment of the fractionation passages according to the invention.

The third embodiment of the fractionation passages C represents the most advantageous structural configuration in terms of performances and is illustrated in FIG. 10 and in FIG. 12. This third embodiment consists in that each fractionation passage C is twisted with respect to the axis of symmetry of the fractionation body 25. More precisely, FIG. 10 illustrates a transversal sectional view of the fractionation body according to this third embodiment and FIG. 12 illustrates a relief view of the fractionation body 25 according to this same embodiment.

To realise this configuration, the fins 4,5 of a same fractionation passage C are twisted around the central axis 1 of the fractionation body. The advantage conferred by this embodiment is to create a radial component $F_g$ to the flow and thus induce a centrifugation of the particles 11 when the fluid flows between the first end and the second end of the passage. This radial component $F_g$ is directed towards the zone where the spacing of the side walls is maximal 7 and thus further favours the thinning out of particles of the zone where the spacing of the two fins 4,5 is minimal 6.

The twisted shape may be given to a passage of triangular or trapezoidal section.

The third embodiment of the fractionation passages C is compatible with the first and the second embodiments of the fractionation passages C and may be realised whatever the shape of the fractionation body 25.

Thus, the most advantageous structural configuration, in terms of performances of the fractionation passages C, consists in that these are formed according to the first, the second and the third embodiments taken in combination, and in that the fractionation body 25 has a truncated ogive shape.

Advantageously, one seeks to simplify the realisation of the device according to the invention and above all to obtain a homogeneous recirculation zone in the region of the wake of the fractionation body 25. Homogenous is taken to mean without perturbations of the flow.

Thus, preferably, the fractionation body 25 comprises a plurality of fractionation passages C uniformly distributed on the periphery of the fractionation body 25. The latter are formed such that two successive passages have a shared fin 4,5. It is thus possible to simplify the realisation of the device and also to obtain a homogenous recirculation zone in the region of the wake of the fractionation body 25.

Achieving a homogeneous recirculation zone in the region of the wake of the fractionation body 25, may also be obtained by positioning an even number of pairs of fins 4, 5, thus an even number of fractionation passages C fixed on the fractionation body 25 such that the acute angle formed by the fins of a first fractionation passage C is opposite to the acute angle formed by the fins of a second passage, diametrically opposed to the first passage.

Figure 13:
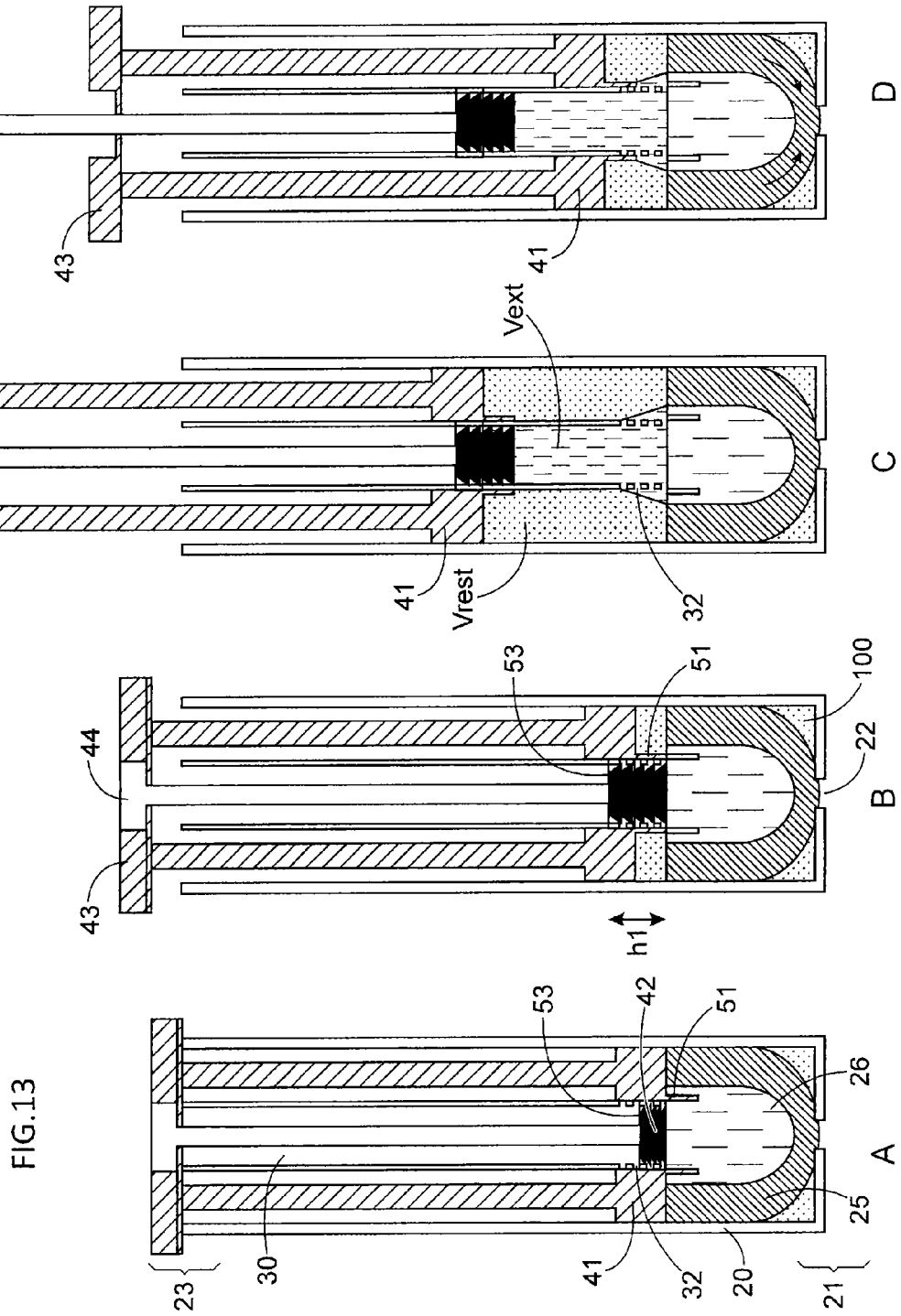
FIG. 13 illustrates the process for the fractionation of a fluid containing particles, and for the extraction of a first particle-lean fluid volume of interest, using the fractionation and extraction device according to the invention.

FIG. 13 illustrates a process for the fractionation of a fluid containing particles and for the extraction of a first particle-lean fluid volume of interest, using the fractionation and extraction device according to the invention.

In the example illustrated in FIG. 13, the fractionation body may or may not comprise fins forming passages C, as described above.

The extraction means 30, 40 described previously include a flange 51 mounted on the first piston 41 and a bellows 53 mounted on the second piston 42. The extraction means 30, 40 are realised according to the first embodiment and the first variant, the pistons moving in a same plane.

During step A, that is to say before the start of the process, no fluid is admitted into the reservoir 20 and the volume of the part of the reservoir comprised between the first piston 41 and the first end of the reservoir is placed under vacuum. The vacuum is maintained thanks to a seal which seals in a leak tight manner the inlet orifice.

The interest of placing under vacuum is to avoid air bubbles that would perturb the physical phenomena, which are the recirculation and the formation of a clear layer.

The first piston 41 and the second piston 42 rest on the flat base 28. The flange 51 is then inserted into a trench formed in the base 28. The bellows 53, comprised between the base 28 and the second piston 42, is compressed.

Before step B, the seal is broken and a sample of fluid 100 containing particles is presented to the device according to the invention. The fluid 100 containing particles then surges around the fractionation body. At step B, the commands 43 and 44 (the command 44 of the second piston being integral with that of the first piston during a movement of the pistons from the first 21 to the second end 23 of the reservoir), of the first 41 and of the second 42 pistons respectively, are then activated in order that the first 41 and the second 42 pistons move from the first end 21 up to the second end 23 of the reservoir. As a result a flow is established and it marks the start of the fractionation and extraction process.

More precisely, the fluid 100 containing particles is pumped and penetrates into the reservoir 20 in the region of the inlet orifice 22 situated in the region of the first end 21 of the reservoir 20. The fluid 100 then flows into the plurality of passages of the fractionation body 25 along the direction of pumping. A recirculation zone is created progressively in the region of the wake of the fractionation body 25. Since the pistons move towards the second end 23 of the reservoir, the bellows 53 which relaxes progressively avoids the introduction of air into the extraction volume that can appear at the start of the fractionation and extraction process when the flange 51 frees the orifices 32 situated the closest to the base 28.

The flange 51 which frees progressively the orifices 32, as a function of their height with respect to the base 28, imposes a delay time for the opening of the orifices 32 in order to await the establishment of re-circulations and thus the formation of a particle-lean recirculation zone. In fact, at the start of the fractionation and extraction process, that is to say when the first piston 41 that rests on the base 28 is moved along the direction of pumping, the recirculation zone is established progressively in the wake of the fractionation body 25 and only reaches the height h1 after a certain establishment time.

During step C, the operator estimates that the particle-lean volume recovered in the extraction means 30 is sufficient. Consequently he no longer acts on the commands 43 and 44. During this step, one has a particle-lean fluid volume $V_{ext}$ situated in the partition and a particle-rich fluid volume in the rest $V_{rest}$ of the reservoir 20. The operator is then going to want to eliminate or recover the particle-rich fluid volume in order to only keep the particle-lean fluid volume $V_{ext}$.

To do so, and as illustrated in step D, the operator is going to act on the command 43 of the first piston 41 which may be separated from that of the second piston 42. The command 44 of the second piston is not activated. The operator is then going to move the first piston 41 from the second end 23 of the reservoir to the first end of the reservoir 21. The particle-rich fluid volume $V_{rest}$ then flows into the reservoir 20 along the direction of flushing and is evacuated from the reservoir in the region of the inlet orifice 22 situated at the first end 21 of the reservoir 20. When the first piston 41 is at the end of stroke, the reservoir 20 now only contains the particle-lean fluid volume, $V_{ext}$. The operator can then handle the reservoir 20 without risk of polluting the particle-lean fluid volume by particles.

During the configuration of the different elements forming the device according to the invention, the extraction volume $V_{ext}$ will be chosen such that the ratio between the extraction volume $V_{ext}$ and the total volume $V_{tot}$ of the reservoir 20 is less than the ratio between the estimated lean volume in the fluid and the total volume of fluid. Thus, the extraction volume $V_{ext}$ will be determined as a function of the application and the fluid intended to be pumped.

For example, in the case where the device according to the invention is applied to the fractionation and the extraction of blood, the particle-lean fluid volume will be the blood plasma. It is known that for one liter of blood, the volume of plasma is 400 to 500 mL. An extraction volume $V_{ext}$ of plasma is then chosen such that $V_{ext} < 0.4\, V_{tot}$ Generally speaking, the extraction volume $V_{ext}$ will be chosen such that it is small with respect to the total volume $V_{tot}$ of fluid that may be pumped into the reservoir. The choice of a small extraction volume $V_{ext}$ compared to the total volume $V_{tot}$ makes it possible to fill the extraction volume $V_{ext}$ before the centrifugation effect disappears. In fact, at the end of the fractionation and extraction process, that is to say when there is no longer fluid to pump into the reservoir 20 through the inlet orifice 22 or that the stroke of the pistons along the direction of pumping is slowed down, the centrifugation effect that takes place in the recirculation zone tends to reduce sharply, which brings some particles to be sucked into the extraction volume $V_{ext}$ and thus to pollute it.

The extraction means 30, 40 must be dimensioned and actuated judiciously in order not to destabilise or attenuate the phenomenon of recirculation that is created at the outlet of the fractionation body 25. This is because a too strong pumping of the fluid F containing particles would have the effect of pinning the flow against the inner wall of the reservoir 20 and to make the vortex disappear whereas a too weak pumping would not enable the formation of vortexes.

A necessary equilibrium must be found between the admission and the extraction so as not to destabilise the vortexes.

Also, the dimensioning of the extraction means 30, 40 will have to be preferentially estimated by simulation in order to enable maximum extraction efficiency.

The device for fractionation and extraction according to the invention will advantageously find application in the medical field, in order to fractionate a blood sample. The device according to the invention then makes it possible to collect a volume of red globule-lean (particles) plasma, and a volume of red globule-rich blood.

The device according to the invention may then serve as pre-separation device upstream of a more advanced purification device. The invention then enables a non-negligible time saving since the fractionation enabled by the device described is rapid. This is because, in the case of blood and thanks to the device according to the invention, it is possible to fill a reservoir with a volume of plasma of several mL in a time of the order of ten or so seconds.

The invention claimed is:

1. A device for fractionation of a volume of fluid containing particles, and for extraction of a particle-lean volume of the fluid and of a particle-rich volume of the fluid, comprising:
   a cylindrical reservoir including at a first end an inlet orifice configured to supply the reservoir with the fluid in a direction from the first end of the reservoir toward a second end of the reservoir;
   a fractionation body, extending along a central axis of the reservoir and housed in the reservoir from an upstream end of the fractionation body to a downstream end of the fractionation body, the upstream end being disposed in vertical alignment with the reservoir above the inlet orifice, a cross section of the fractionation body taken in a plane substantially perpendicular to the central axis decreases at the downstream end,
   the fractionation body defining, with the reservoir, a first passage opening at the downstream end of the fractionation body into a zone having a geometric singularity configured to form a recirculation zone disposed downstream of the downstream end,
   the fractionation body being a solid body, configured to direct the fluid supplied at the inlet orifice along the solid body and into the first passage; and
   an extractor, comprising an annular partition and having at least one end portion disposed downstream of the fractionation body, configured to separate and to extract the particle-lean volume and the particle-rich volume from the volume of the fluid, the annular partition having an end portion disposed in contact with the downstream end of the fractionation body and being configured to delimit an extraction volume of the fluid as the fluid circulates in the recirculation zone, and to receive the particle-lean volume in the delimited extraction volume at a region of the annular partition.

2. The device according to claim 1, wherein the fractionation body comprises a substantially flat base at the downstream end.

3. The device according to claim 1, wherein the fractionation body is of axisymmetric and paraboloidal shape.

4. The device according to claim 1, wherein the cross section of the fractionation body increases between the upstream end and the downstream end.

5. The device according to claim 1, wherein the cross section of the fractionation body substantially increases between the upstream end and an intermediate zone situated upstream of the downstream end, and is substantially constant between the intermediate zone and the downstream end.

6. The device according to claim 1, wherein the annular partition comprises a plurality of through orifices disposed in a region of the recirculation zone, each of the orifices of the plurality having a diameter less than an average diameter of particles in the volume of fluid.

7. The device according to claim 1, wherein the extractor comprises:
a first piston configured to move between an inner wall of the reservoir and the annular partition, and to recover the particle-rich volume from the volume of fluid; and
a second piston configured to move in a space delimited by the annular partition, and to recover the particle-lean volume from the volume of fluid,
the first and second pistons being further configured to move from an initial position in a direction from the first end of the reservoir toward the second end of the reservoir, and to create vortexes in the recirculation zone at an outlet of the first passage.

8. The device according to claim 7, the first and second pistons being a single part.

9. The device according to claim 8, wherein movement of the second piston is integral with that of the first piston in a direction from the first end toward the second end of the reservoir, the second piston configured to be separable from the first piston and movable independent of the first piston in a direction from the second end toward the first end of the reservoir, and to expulse residual particle-rich volume from the reservoir.

10. The device according to claim 7, wherein the second piston comprises a bellows.

11. The device according to claim 7, wherein the first piston comprises a flange disposed along the annular partition, the flange being configured to free successively the through orifices as a function of a stroke of the first piston in the direction from the first end of the reservoir toward the second end of the reservoir.

12. The device according to claim 7, wherein the extractor is configured to be removable from the device, and to be inserted partly into the reservoir in a hollowed out portion of a base of the fractionation body.

13. The device according to claim 1, wherein the fractionation body includes a plurality of fins fixed on a surface of the fractionation body, between the downstream end and the upstream end, each fin of the plurality of fins extending between the surface of the fractionation body and an inner wall of the reservoir, such that a space separating the inner wall of the reservoir from the fractionation body is split into a plurality of second passages, each second passage of the plurality of second passages being delimited by two adjacent fins of the plurality of fins.

14. The device according to claim 13, wherein two adjacent fins of the plurality of fins delimit a second passage and form, between said fins, an acute angle.

15. The device according to claim 13, wherein a cross section of a second passage, transverse to a direction of flow of the fluid, as a straight section, is of triangular shape.

16. The device according to claim 14, wherein the thickness of the plurality of fins increases from the upstream end toward the downstream end of the fractionation body and/or the acute angle formed between the two adjacent fins delimiting the second passage decreases from the upstream end toward the downstream end of the fractionation body.

17. The device according to claim 13, wherein each second passage of the plurality of second passages is twisted with respect to an axis parallel to a direction of flow of the fluid.

18. A device for fractionation of a volume of a blood sample into a volume of globule-lean plasma and a volume of globule-rich blood, and for extraction of the volume of globule-lean plasma from the blood sample, comprising:
a cylindrical reservoir including at a first end an inlet orifice configured to supply the reservoir with the blood sample in a direction from the first end of the reservoir toward a second end of the reservoir;
a fractionation body, extending along a central axis of the reservoir and housed in the reservoir from an upstream end of the fractionation body to a downstream end of the fractionation body, the upstream end being disposed in vertical alignment with the reservoir above the inlet orifice, a cross section of the fractionation body taken in a plane substantially perpendicular to the central axis decreases at the downstream end,
the fractionation body defining, with the reservoir, a first passage opening at the downstream end of the fractionation body into a zone having a geometric singularity configured to form a recirculation zone disposed downstream of the downstream end,
the fractionation body being a solid body, configured to direct the fluid supplied at the inlet orifice along the solid body and into the first passage; and
an extractor, comprising an annular partition and having at least one end portion disposed downstream of the fractionation body, configured to separate and to extract the globule-lean volume and the globule-rich volume from the volume of the blood sample, the annular partition having an end portion disposed in contact with the downstream end of the fractionation body and being configured to delimit an extraction volume of the blood sample as the blood sample circulates in the recirculation zone, and to receive the globule-lean volume in the delimited extraction volume at a region of the annular partition.

19. The device for fractionation of a fluid according to claim 2, wherein the annular partition is irremovably fixed to the substantially flat base.

20. The device for fractionation of a fluid according to claim 2, wherein the at least one end portion of the annular partition is sealed to the substantially flat base.

* * * * *